(12) United States Patent
Cakulev et al.

(10) Patent No.: US 11,652,854 B2
(45) Date of Patent: May 16, 2023

(54) USER-CONFIGURED NETWORK FALLBACK CONTROL

(71) Applicant: Verizon Patent and Licensing Inc., Basking Ridge, NJ (US)

(72) Inventors: Violeta Cakulev, Millburn, NJ (US); Sudhakar Reddy Patil, Flower Mound, TX (US); Ali Imdad Malik, East Brunswick, NJ (US); Timothy M. Dwight, Richardson, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 69 days.

(21) Appl. No.: 17/024,104

(22) Filed: Sep. 17, 2020

(65) Prior Publication Data

US 2022/0086198 A1   Mar. 17, 2022

(51) Int. Cl.

| | |
|---|---|
| *H04L 65/1096* | (2022.01) |
| *H04L 65/1016* | (2022.01) |
| *H04L 65/1059* | (2022.01) |
| *H04L 65/1076* | (2022.01) |
| *H04L 65/1063* | (2022.01) |
| *H04L 65/1104* | (2022.01) |
| *H04W 88/06* | (2009.01) |
| *H04W 36/00* | (2009.01) |
| *H04W 84/04* | (2009.01) |

(52) U.S. Cl.
CPC ...... *H04L 65/1096* (2013.01); *H04L 65/1016* (2013.01); *H04L 65/1059* (2013.01); *H04L 65/1063* (2013.01); *H04L 65/1076* (2013.01); *H04L 65/1104* (2022.05); *H04W 36/0022* (2013.01); *H04W 84/042* (2013.01); *H04W 88/06* (2013.01)

(58) Field of Classification Search
CPC ............. H04L 65/1096; H04L 65/1006; H04L 65/1016; H04L 65/1059; H04L 65/1063; H04L 65/1076; H04W 36/0022; H04W 84/042; H04W 88/06
See application file for complete search history.

(56) References Cited

U.S. PATENT DOCUMENTS

| | | | |
|---|---|---|---|
| 10,791,450 B1 * | 9/2020 | Bakker | H04W 4/90 |
| 2008/0039150 A1 * | 2/2008 | Lin | H04N 7/15 |
| | | | 348/E7.083 |
| 2010/0134590 A1 * | 6/2010 | Lindstrom | H04L 69/24 |
| | | | 348/14.11 |
| 2010/0302937 A1 * | 12/2010 | Hu | H04W 76/18 |
| | | | 370/225 |
| 2015/0365532 A1 * | 12/2015 | Ristock | H04M 3/541 |
| | | | 379/212.01 |
| 2017/0111404 A1 * | 4/2017 | Noldus | H04L 65/1006 |

(Continued)

*Primary Examiner* — Khaled M Kassim

(57) ABSTRACT

A device receives a call invitation message with a Session Description Protocol (SDP) offer for establishing a call between a calling party and a called party and obtains a set of network fallback rules associated with the called party. The device determines, based on the set of network fallback rules, whether to reject the call and avoid network fallback from a first wireless network to a second wireless network. The device sends, based on the determination, a call denial message without an SDP answer, to reject the call and avoid the network fallback.

18 Claims, 14 Drawing Sheets

(56) References Cited

U.S. PATENT DOCUMENTS

| | | | | |
|---|---|---|---|---|
| 2018/0343343 A1* | 11/2018 | Filart | ............... | H04W 12/126 |
| 2019/0306202 A1* | 10/2019 | Sinha | ............... | H04L 65/1046 |
| 2020/0112887 A1* | 4/2020 | Kwok | ............... | H04W 36/0022 |
| 2020/0359239 A1* | 11/2020 | Mirza | ............... | H04L 65/1069 |
| 2020/0382565 A1* | 12/2020 | Manninen | ............ | H04L 65/102 |

* cited by examiner

USER-CONFIGURED NETWORK FALLBACK CONTROL

BACKGROUND

Next Generation mobile networks, such as Fifth Generation New Radio (5G NR) mobile networks, are expected to operate in various frequency ranges, including higher frequency ranges (e.g., in the gigahertz (GHz) frequency band), and to have a broad bandwidth (e.g., near 500-1,000 megahertz (MHz)). The expected bandwidth of Next Generation mobile networks is intended to support higher speed downloads. 5G mobile telecommunications networks may support more reliable, massive machine communications (e.g., machine-to-machine (M2M), Internet of Things (IoT)). Next Generation mobile networks are expected to enable a higher utilization capacity than current wireless networks, permitting a greater density of wireless users. Next Generation mobile networks are designed to increase data transfer rates, increase spectral efficiency, improve coverage, improve capacity, and reduce latency.

The Internet Protocol (IP) multimedia subsystem (IMS), defined by the 3$^{rd}$ Generation Partnership Project (3GPP), is an architectural framework for implementing IP-based telephony and multimedia services. IMS defines a set of specifications that enables the convergence of voice, video, data and mobile technology over an all IP-based network infrastructure. In particular, IMS fills the gap between the two most successful communication paradigms—cellular and Internet technology, by providing Internet services everywhere using cellular technology in a more efficient way. Session Initiation Protocol (SIP) is the main protocol for IMS. SIP is an application layer control (signaling) protocol for creating, modifying and terminating sessions (e.g., voice sessions) with one or more participants.

DETAILED DESCRIPTION OF THE PREFERRED EMBODIMENTS

Figure 1:
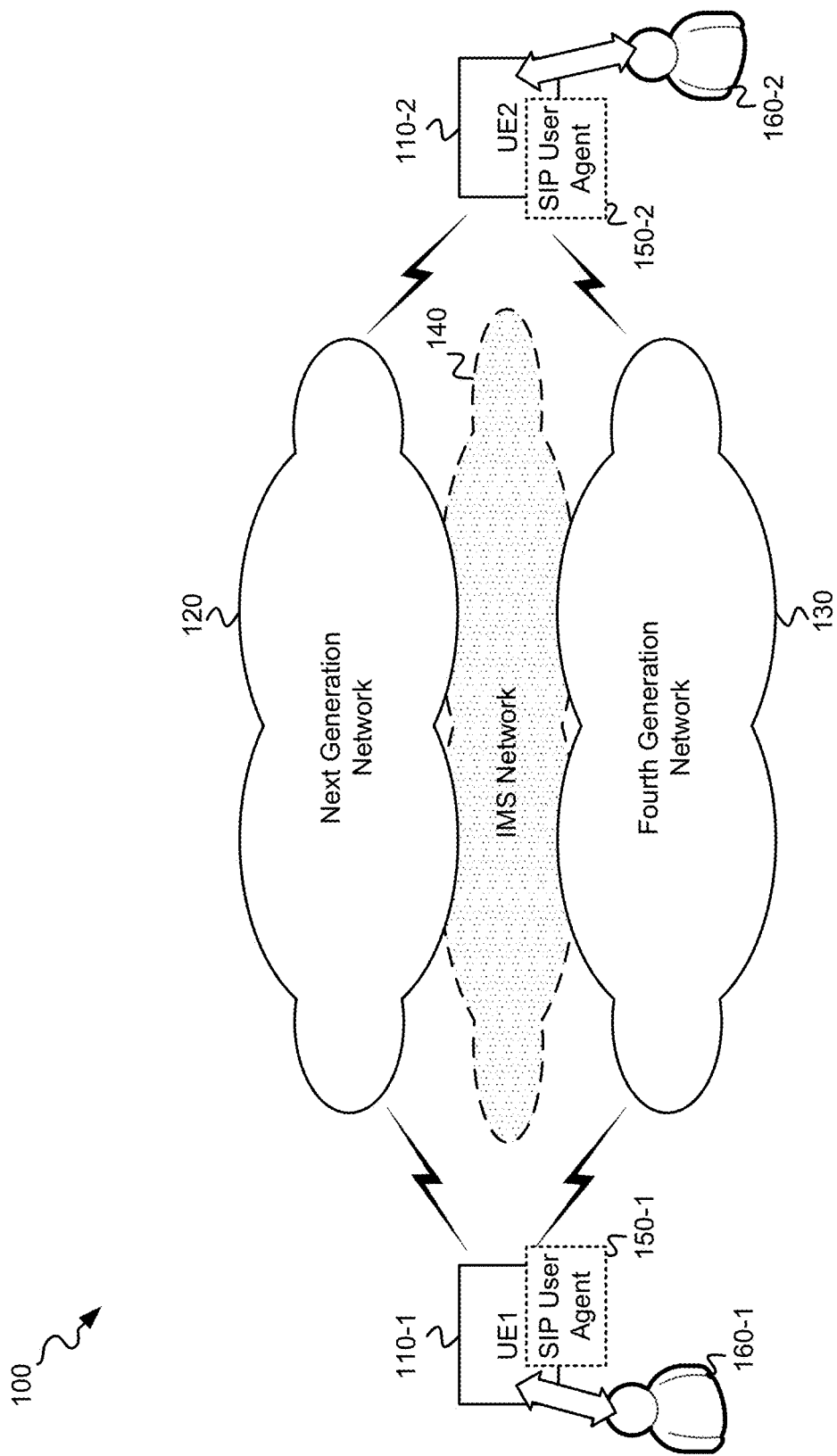
FIG. 1 depicts an exemplary network environment in which calls may be transported to and from user equipment devices via either a Next Generation mobile network or a Fourth Generation mobile network.

The following detailed description refers to the accompanying drawings. The same reference numbers in different drawings may identify the same or similar elements. The following detailed description does not limit the invention.

The Third Generation Partnership Project (3GPP) has defined a capability for Fourth Generation (4G) and Next Generation wireless networks to interwork with one another in network implementations in which both networks provide coextensive wireless service to a same geographic region. In such interworked network environments, voice sessions may selectively be directed to either the Next Generation wireless network or the 4G network. When a user equipment device (UE) first registers in the Next Generation wireless network, the UE creates an IMS PDU session and performs IMS registration and the initial signaling procedures involved in setting up a voice call over the Next Generation wireless network. After registration, when a flow for voice traffic is requested by the UE, a Next Generation NodeB (gNB) of the Next Generation wireless network may decide whether the UE should be redirected to the 4G wireless network that provides wireless service to the same geographic region. If the gNB decides on redirection to the 4G network, the gNB causes existing PDU sessions for the UE to be handed over to the 4G wireless network. This process may be referred to as "Evolved Packet System (EPS) fallback" or "4G fallback."

In certain scenarios, PDU sessions can be redirected, during EPS fallback, to the 4G network even though the user of the UE may not wish to receive the particular call. For example, in certain circumstances, a provisional response (e.g., a SIP 183 response with a Session Description Protocol (SDP) Answer) is typically triggered by a called UE before the user of the UE is even aware of the call and has an opportunity to decline the call. Once the provisional response is triggered, the EPS fallback process is initiated, resulting in an unneeded redirection to the 4G network that causes a waste of resources, including unnecessary signaling and a potential service degradation while the UE is serviced by the 4G network.

Exemplary embodiments described herein implement functionality that avoids unnecessary EPS fallbacks by rejecting call requests and blocking provisional call responses, with SDP Answers, unless there is some level of certainty that the call will be accepted by the user of the called UE. The functionality may be implemented in different locations within the network environment, such as, for example, in the called UE itself, or within a node (e.g., a Telephony Application Server (TAS)) of the IMS network. When a SIP invite, with SDP offer, is sent by the calling UE, the functionality described herein applies network fallback rules, generated based on user-configured criteria, to determine whether the call from this particular calling party should be rejected to avoid possible network fallback (e.g., EPS fallback).

FIG. 1 depicts an exemplary network environment 100 in which calls may be transported to and from user equipment devices (UEs) via either a Next Generation mobile network or a 4G mobile network. As shown, network environment 100 includes a calling user equipment device (UE) 110-1, a called UE 110-2, a next generation network 120, an IMS network 140, and a 4G network 130.

UEs 110-1 and 110-2 (referred to herein as "UE 110" or "UEs 110") may each include any type of electronic device having a wireless communication capability. UE 110 may include, for example, a laptop, palmtop, desktop, or tablet computer; a cellular phone (e.g., a "smart" phone); a Voice over Internet Protocol (VoIP) phone; a smart television (TV); an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate UE 110. For example, as shown, a first user 160-1 may operate UE 110-1 and a second user 160-2 may operate UE 110-2. UEs 110 may each execute a respective Session Initiation Protocol (SIP) user agent (UA) that may establish connections and sessions with other UEs 110. For example, as shown in FIG. 1, UE 110-1 may execute a SIP UA 150-1 and UE 110-2 may execute a SIP UA 150-2. SIP UA 150-1 at UE 110-1 may establish a call session with SIP UA 150-2 at UE 110-2. Protocols other than SIP may be used for call control and session establishment. Such protocols may employ messaging that is different than the SIP messages described herein.

Next generation network 120 includes any type of a Next Generation Mobile network that includes evolved network components (e.g., future generation components) relative to a Long-Term Evolution (LTE) network, such as a 4G or 4.5G mobile network. In one implementation, Next Generation Mobile network 120 may include a 5G mobile network.

IMS network 140 includes a network that uses SIP for voice and multimedia session control, such as for creating, modifying, and terminating sessions between devices (e.g., between UEs 110-1 and 110-2). 4G network 130 includes any type of a Public Land Mobile Network (PLMN) that implements a LTE mobile telecommunications standard, such as the 4G or 4.5G LTE standard.

The configuration of network components of network environment 100 is shown in FIG. 1 is for illustrative purposes. Other configurations may be implemented. Therefore, network environment 100 may include additional, fewer, and/or different components that may be configured in a different arrangement than that depicted in FIG. 1. For example, network environment 100 may include numerous UEs (e.g., UEs 110-1 through 110-x, where x>2). Further, network environment 100 may include additional networks not shown in FIG. 1. For example, Next Generation network 120 and 4G network 130 may connect to one or more other types of networks, such as, for example, local area networks (LANs) (e.g., wireless LANs, such as WiFi networks), wide area networks (WANs), metropolitan area networks (MANs), Public Switched Telephone Networks (PSTNs), and/or the Internet. Though distinct Next Generation and 4G networks 120 and 130 are shown in FIG. 1, Next Generation network 120 and 4G network 130 may be combined as a single hybrid Next Generation/4G network that includes certain components of both a Next Generation network and a 4G network.

Figure 2:
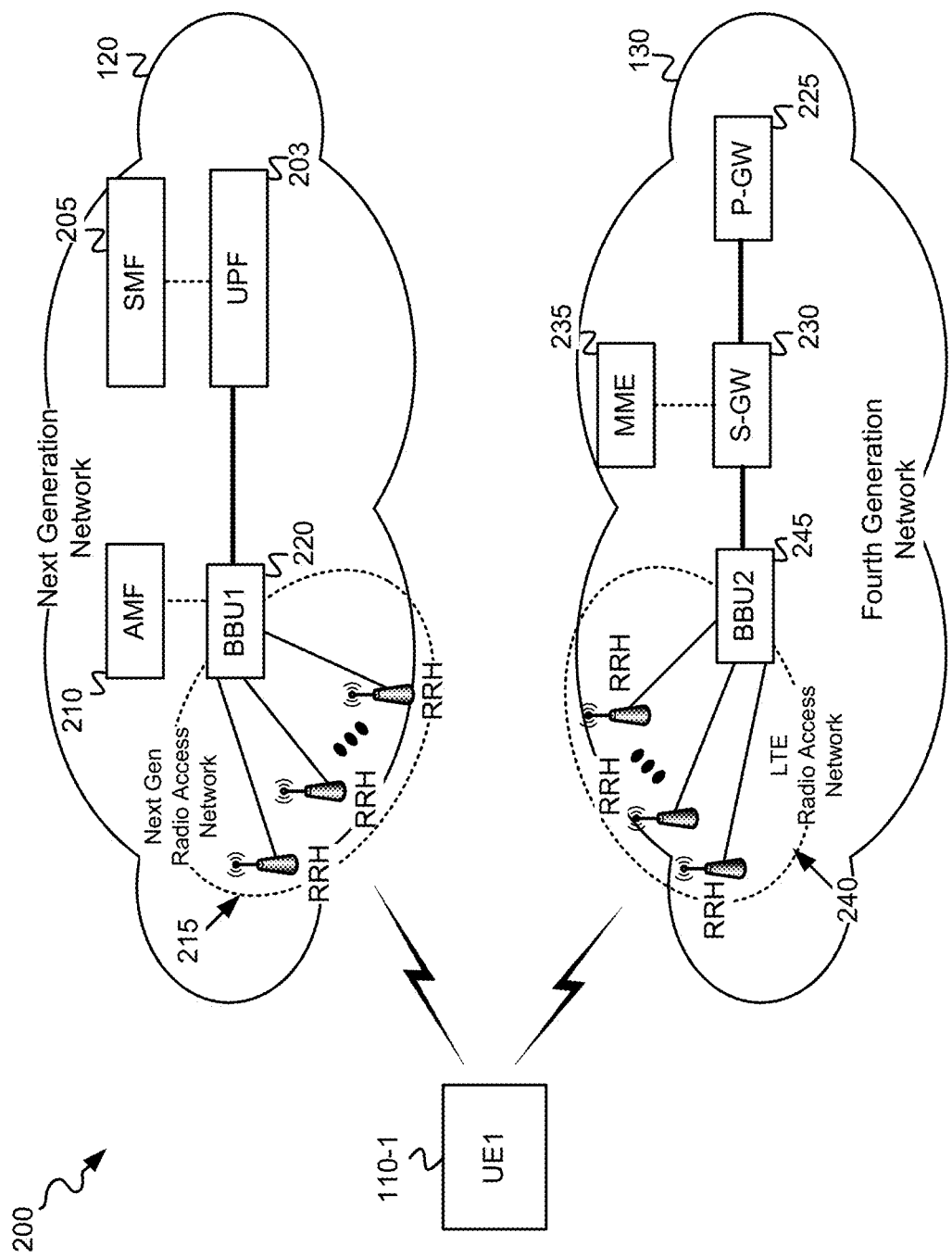
FIG. 2 depicts details of an exemplary portion of the network environment of FIG. 1 that includes the Next Generation mobile network and the Fourth Generation mobile network.

FIG. 2 depicts details of an exemplary portion 200 of network environment 100 of FIG. 1 that includes Next Generation Mobile network 120 and 4G network 130. In the portion 200 shown in FIG. 2, Next Generation Mobile network 120 includes, among other nodes, a User Plane Function (UPF) node 203, a Session Management Function (SMF) node 205, an Access Management Function (AMF) node 210, and a Next Generation Radio Access Network (RAN) 215.

UPF node 203 includes a network device that acts as a router and a gateway between Next Generation Mobile network 120 and an external packet data network (not shown), and forwards session data between the external packet data network and a base band unit in Next Generation Mobile network 120. Next Generation Mobile network 120 may include multiple UPF devices 203 disposed at various geographic locations in network 120. SMF node 205 includes a network device that performs session management, allocates network addresses to UEs 110, and selects and controls the UPF device 203 for data transfer. AMF node 210 includes a network device that performs UE-based authentication, authorization, and mobility management for UEs 110.

As shown in FIG. 2, Next Generation Radio Access Network (RAN) 215 may include a first base band unit (BBU1) 220 and multiple remote radio heads (RRHs). Next Generation RAN 215 may also include one or more additional base band units (BBUs) and RRHs, and other wireless nodes and components, not shown in FIG. 2. BBU1 220 may connect to the multiple RRHs via, for example, optical fibers. BBU1 220 includes a network device that operates as a digital function unit that transmits digital baseband signals to the multiple RRHs, and receives digital baseband signals from the multiple RRHs. If BBU1 220 is connected to the multiple RRHs via, for example, optical fibers, then BBU1 220 may convert the digital baseband signals into corresponding optical signals for transmission to the RRHs, and may receive optical signals from the RRHs and convert the optical signals into corresponding digital baseband signals.

The RRHs include network devices that operate as radio function units that transmit and receive radio frequency (RF) signals to/from UEs 110. If the RRHs are connected to BBU1 220 via an optical fiber, the RRHs may convert received RF signals to optical signals, and transmit the optical signals to BBU1 220. Additionally, the RRHs may receive optical signals from BBU1 220 via the optic fiber and convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 110, and to transmit wireless RF signals to UE 110. If Next Generation Mobile network 120 is a 5G New Radio (NR) network, BBU1 220 and a RRH represent a distributed Next Generation NodeB, which may also be referred to as a "gNB," or an enhanced LTE (eLTE) eNB that can connect to Next Generation Mobile network 120.

As further shown in the network portion 200 of FIG. 2, 4G network 130 includes, among other nodes, a Packet Gateway node (P-GW) 225, a Serving Gateway node (S-GW) 230, a Mobility Management Entity node (MME) 235, and an LTE RAN 240.

Packet Gateway node (P-GW) 225 includes a network device that acts as a router and a gateway between 4G network 130 and the external packet data network (not shown), and forwards session data between the packet data network and a base band unit in 4G network 130. Serving Gateway node (S-GW) 230 includes a network device that routes and forwards session data between P-GW 225 and a LTE RAN 240 serving the session's destination UE 110.

Mobility Management Entity node (MME) 235 includes a network device that acts as a control entity for 4G network 130, including communicating with a HSS (not shown in FIG. 2) of 4G network 130 for user/device authentication and for user/device profile download. MME node 235 further provides UEs 110 with mobility management and session management functions using, for example, Network Access Stratum (NAS) signaling.

LTE RAN 240 may include a second base band unit (BBU2) 245 and multiple remote radio heads (RRHs). LTE RAN 240 may include one or more additional base band units (BBUs) and RRHs, and other wireless nodes and components, not shown in FIG. 2. BBU2 245 may connect to the multiple RRHs via, for example, optical fibers. BBU2 245 includes a network device that operates as a digital function unit that transmits digital baseband signals to the multiple RRHs and receives digital baseband signals from the multiple RRHs. If BBU2 245 is connected to the multiple RRHs via, for example, optical fibers, then BBU2 245 may convert the digital baseband signals into corresponding optical signals for transmission to the RRHs, and may receive optical signals from the RRHs and convert the optical signals into corresponding digital baseband signals.

The RRHs include network devices that operate as radio function units that transmit and receive radio frequency (RF) signals to/from UEs 110. If the RRHs are connected to BBU2 245 via an optical fiber, the RRHs may convert received RF signals to optical signals, and transmit the optical signals to BBU2 245. Additionally, the RRHs may receive optical signals from BBU2 245 via the optic fiber and convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 110, and to transmit wireless RF signals to UE 110. In 4G network 130, BBU2 245 and a RRH represent a distributed evolved NodeB (eNB).

FIG. 2 illustrates an exemplary implementation of the configuration of the components of Next Generation network 120 and 4G network 130. Other components and configurations of Next Generation network 120 and 4G network 130 may, however, be implemented. Therefore, Next Generation network 120 and 4G network 130 may each include additional, fewer, and/or different components, that may be configured differently, than depicted in FIG. 2 and described herein. For example, though only a single base band unit BBU1 220, and a single base band unit BBU2 245, are shown as components of Next Generation RAN 215 and LTE RAN 240, respectively, each of Next Generation RAN 215 and LTE RAN 240 may include multiple base band units (i.e., >1 base band unit), with each of the multiple base band units further connecting to at least one RRH. As another example, though only a single AMF 210, SMF 205, and UPF 203 is shown in Next Generation network 120, and only a single MME 235, S-GW 230 and P-GW 225 is shown in 4th Generation network 130, multiple ones of each of these network functions may reside in networks 120 and 130.

Figure 3:
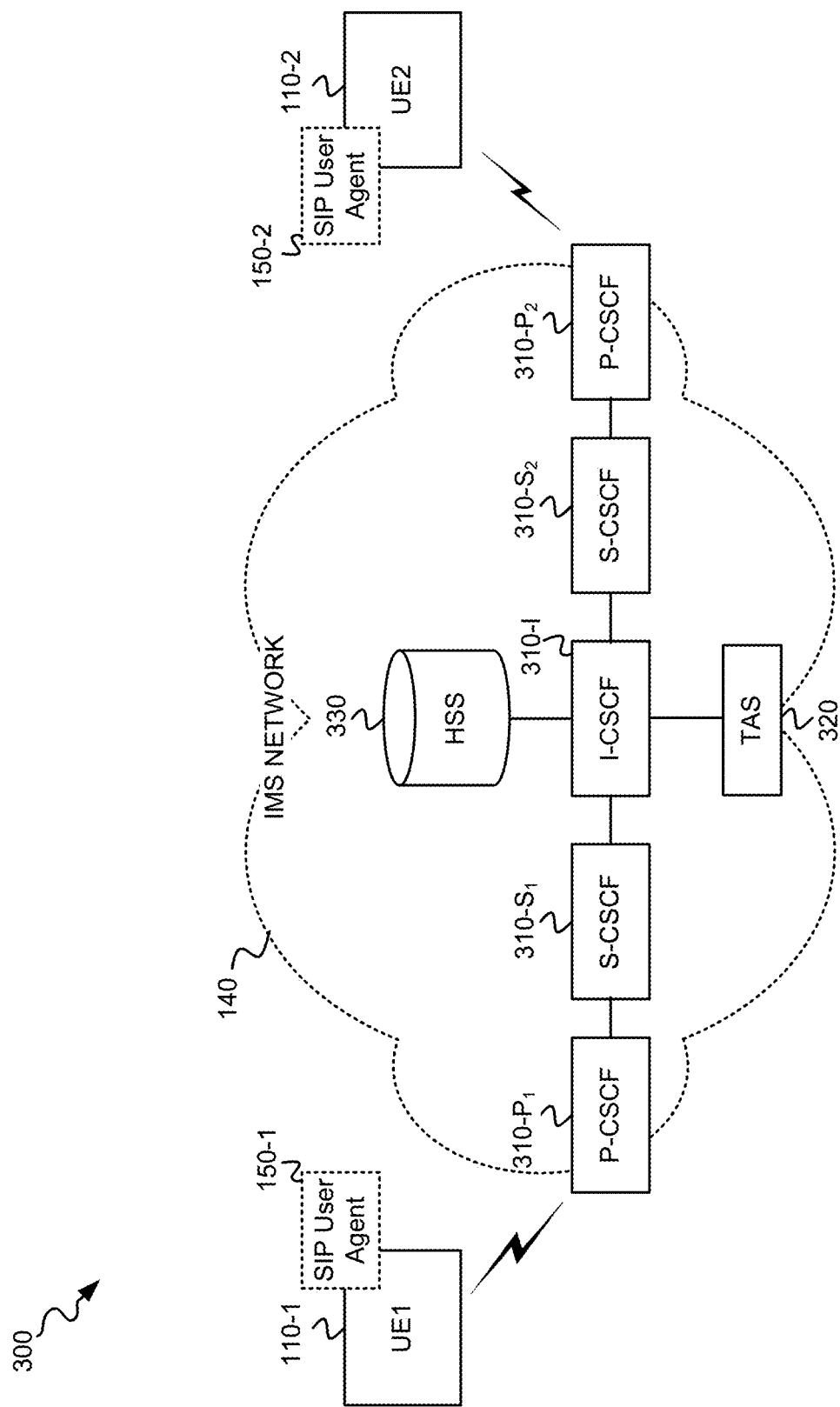
FIG. 3 depicts another portion of the network environment of FIG. 1 that includes components of the Internet Protocol multimedia subsystem (IMS)

FIG. 3 depicts another portion 300 of the network environment 100 of FIG. 1, including components of IMS network 140. As shown, IMS network 140 may include a Proxy Call Session Control Function (P-CSCF) 310-$P_1$, a serving Call Session Control Function (S-CSCF) 310-$S_1$, an Interrogating Call Session Control Function I-CSCF 310-I, a S-CSCF 310-$S_2$, a P-CSCF 310-$P_2$, a Home Subscriber Server (HSS) 330, and a telephony application server (TAS) 320. P-CSCF 310-$P_1$, S-CSCF 310-$S_1$, I-CSCF 310-I, S-CSCF 310-$S_2$, and P-CSCF 310-$P_2$ may be generically and individually referred to herein as "CSCF 310".

P-CSCF 310-$P_1$ acts as an edge of IMS network 140 through which UE 110-1 obtains access. P-CSCF 310-$P_1$ maintains an awareness of all IMS endpoints that are currently registered with IMS network 140, and performs various manipulations of SIP signaling messages that are arriving from, or being sent to, the IMS endpoints (e.g, UEs 110-1 and 110-2). P-CSCF 310-$P_1$ maintains a connection with S-CSCF 310-$S_1$.

S-CSCF 310-$S_1$ processes all originating and terminating SIP requests and responses associated with endpoints registered with S-CSCF 310-$S_1$ (including UE 110-1). S-CSCF 310-$S_1$ routes the SIP signaling towards its destination (e.g., towards P-CSCF 310-$P_1$ and UE 110-1), or towards UE 110-2 via I-CSCF 310-I. I-CSCF 310-I passes SIP signaling to/from S-CSCF 310-$S_1$ and S-CSCF 310-$S_2$. I-CSCF 310-I queries HSS 330 to learn the identity of the S-CSCF assigned to a given UE 110 so that it can properly forward the SIP signaling. HSS 330 includes a master user database (DB) that supports all of CSCFs 310 of IMS network 140. The master user DB of HSS 330 stores user subscription-related information (e.g., subscriber profiles), and performs authentication and authorization of the user. The subscriber profiles stored in the DB of HS 330 may include an indication of whether a given user has subscribed to usage of 4G network 130 and/or Next Generation Network 120.

S-CSCF 310-$S_2$ processes all originating and terminating SIP requests and responses associated with endpoints registered with S-CSCF 310-$S_2$ (including UE 110-2). S-CSCF 310-$S_2$ routes the SIP signaling towards its destination (e.g., towards P-CSCF 310-$P_2$ and UE 110-2), or towards UE 110-1 via I-CSCF 310-I. P-CSCF 310-$P_2$ acts as an edge of IMS network 140 through which UE 110-2 obtains access. P-CSCF 310-$P_2$ maintains an awareness of all IMS endpoints that are currently registered with IMS network 140 and performs various manipulations of SIP signaling messages that are arriving from, or being sent to, the IMS endpoints (e.g., UEs 110-1 and 110-2). P-CSCF 310-$P_2$ maintains a connection with S-CSCF 310-$S_2$. S-CSCF 310-$S_1$ and S-CSCF 310-$S_2$ may obtain subscriber profile information from HSS 330 to determine whether UE 110-1 and/or UE 110-2 are subscribed for usage of 4G network 130 and/or Next Generation Network 120. TAS 320 may function as a multimedia application server that provides call control for voice and video between UEs 110. TAS 320 may serve the called UE 110 during call establishment. A same, or different TAS 320, may serve the calling UE 110 during call establishment.

P-CSCF S-CSCF I-CSCF 310-I, S-CSCF 310-$S_2$, P-CSCF 310-$P_2$ and/or TAS 320 may each include functionality implemented in multiple, different network devices, or in a same, single network device. P-CSCF S-CSCF I-CSCF 310-I, S-CSCF 310-$S_2$, P-CSCF 310-$P_2$, and/or TAS 320 may be purpose-built hardware appliances or may be virtualized network functions (VNFs) running on general-purpose hardware (e.g., network devices) in a cloud environment as part of a Network Functions Virtualization (NFV) deployment.

The configuration of network components of portion 300, of the network environment 100 of FIG. 1, shown in FIG. 3 is for illustrative purposes. Other configurations may be implemented. Therefore, portion 300 may include additional, fewer, and/or different components that may be configured in a different arrangement than that depicted in FIG. 2.

Figure 4:
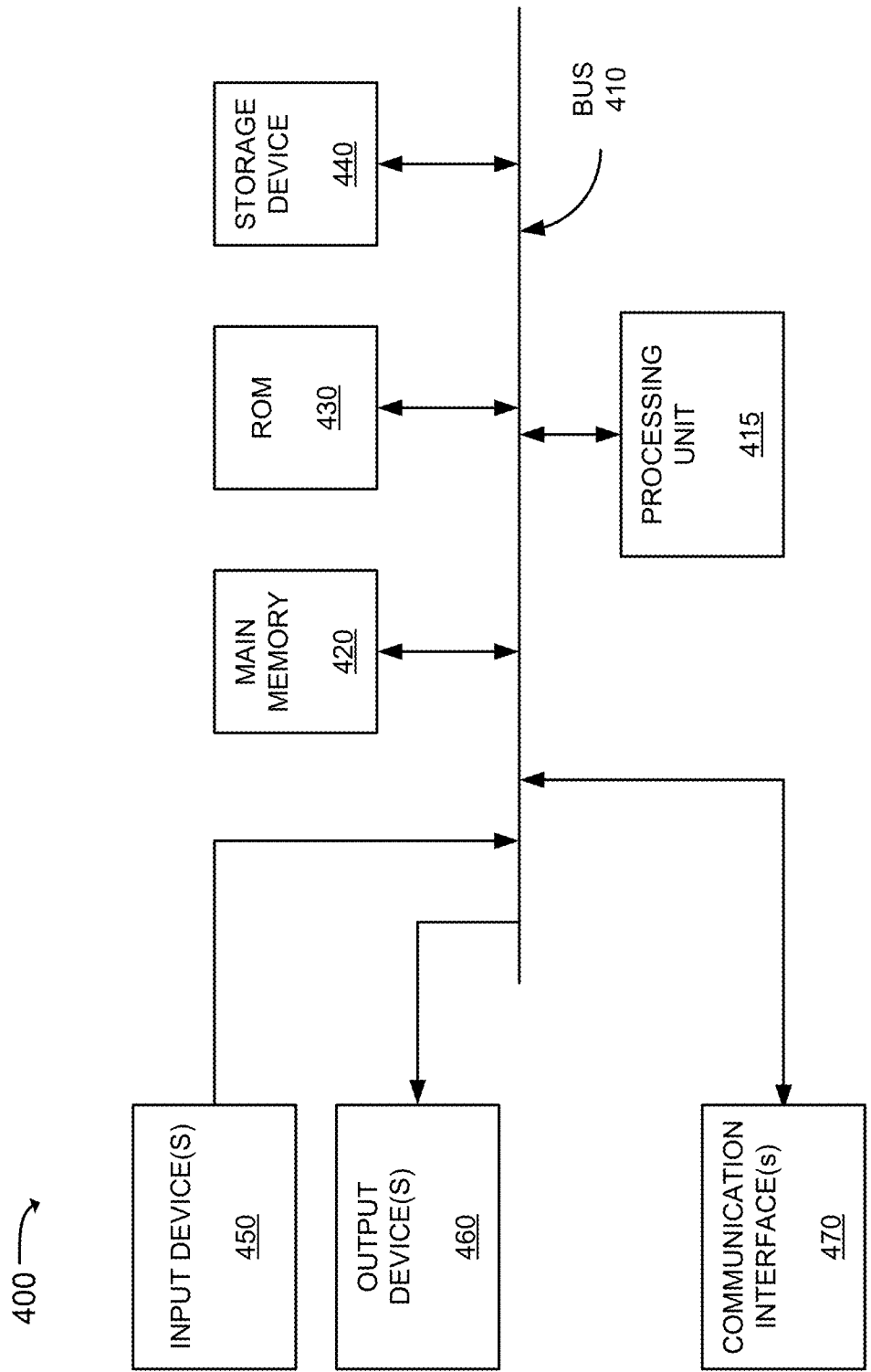
FIG. 4 is a diagram that depicts exemplary components of a device that may correspond to the devices, or which may execute functions, that are depicted in FIGS. 2 and 3.

FIG. 4 is a diagram that depicts exemplary components of a device 400. UEs 110 and devices implementing UPF 203, SMF 205, AMF 210, BBU 220, P-GW 225, S-GW 230, MME 235, BBU 245, CSCF 310, and TAS 320 may be similarly configured. Device 400 may include a bus 410, a processing unit 420, a main memory 430, a read only memory (ROM) 440, a storage device 450, an input device(s) 460, an output device(s) 470, and a communication interface(s) 480. Bus 410 may include a path that permits communication among the components of device 400.

Processing unit 420 may include one or more processors or microprocessors, or processing logic, which may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium. Main memory 430, ROM 440 and storage device 450 may each be referred to herein as a "tangible non-transitory computer-readable medium." In some implementations, the processes/methods set forth herein can be implemented as instructions that are stored in main memory 430, ROM 440 and/or storage device 450 for execution by processing unit 420.

Input device 460 may include one or more mechanisms that permit an operator to input information into device 400, such as, for example, a keypad or a keyboard, a display with a touch sensitive panel, voice recognition and/or biometric mechanisms, etc. Output device 470 may include one or more mechanisms that output information to the operator, including a display, a speaker, etc. Input device 460 and output device 470 may, in some implementations, be implemented as a user interface (UI) that displays UI information and which receives user input via the UI. Communication interface(s) 480 may include a transceiver that enables device 400 to communicate with other devices and/or systems. For example, communication interface(s) 480 may include wired or wireless transceivers for communicating via networks 120, 130, and/or 140.

The configuration of components of device 400 illustrated in FIG. 4 is for illustrative purposes. Other configurations may be implemented. Therefore, device 400 may include additional, fewer and/or different components than those depicted in FIG. 4.

Figure 5A:
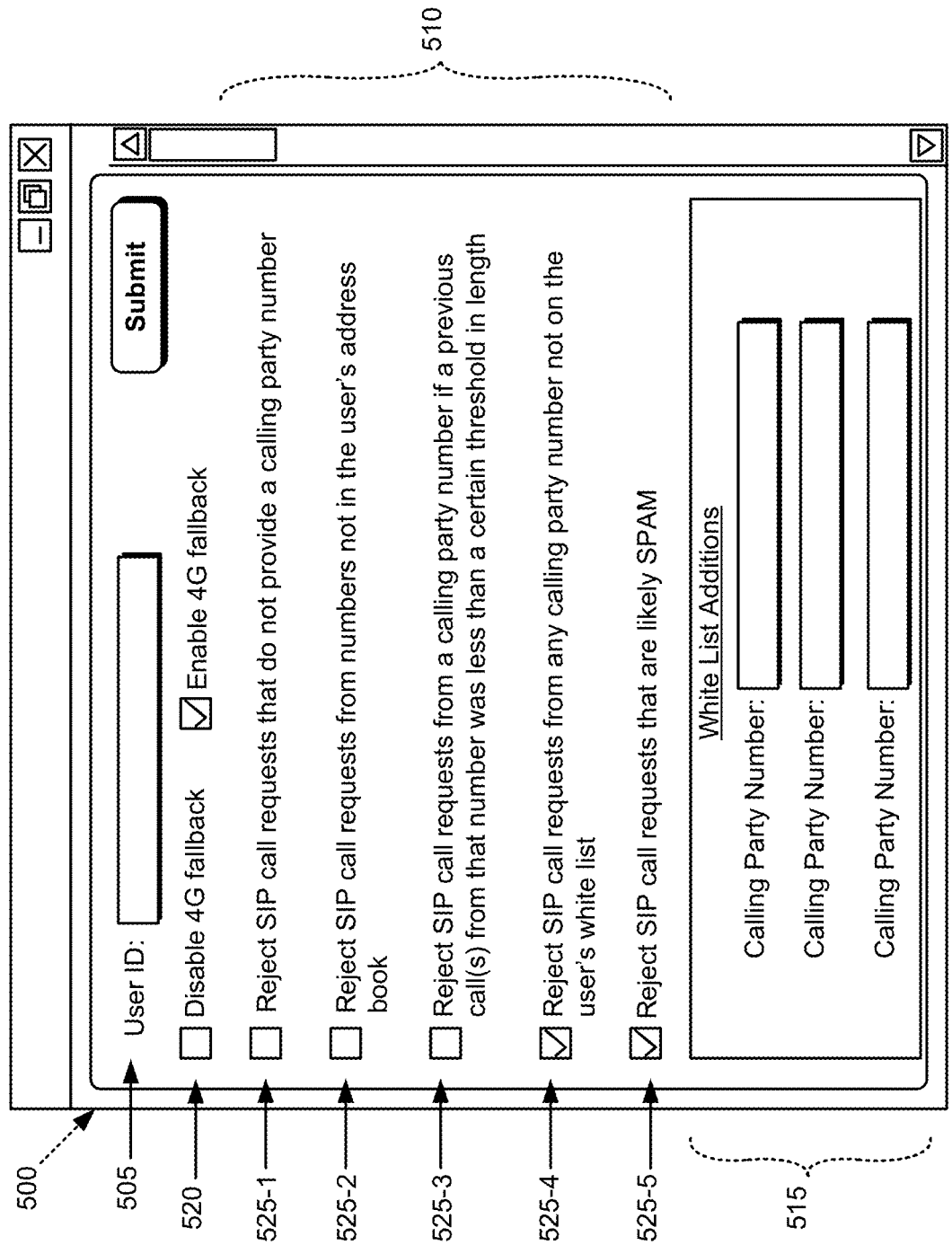
FIG. 5A depicts an exemplary user interface that may be implemented at a user equipment device to enable a device user to select the criteria under which network fallback is permitted to occur for the device.

FIG. 5A depicts an exemplary user interface 500 that may be implemented at a UE 110, or other device, to enable a user 160 to select the criteria under which 4G fallback may be permitted to occur for the user 160's UE 110. The user-selected criteria may then be used to generate a set of network fallback rules for the user 160's UE 110 for use when a call is made to the UE 110. User interface 500 may include a user ID field 505, a 4G fallback disabling/enabling section 520, a user-configurable criteria selection section 510, and a white list additions section 515.

User ID field 505 includes a field into which a user 160 may enter their unique user ID. In one implementation, the user ID may be a telephone number for the UE 110. In another implementation, the user ID may be an account number associated with the user 160. In this latter implementation, the account number may be associated with multiple different UEs 110.

4G fallback disabling/enabling section 520 may include two checkboxes. Selection of the "Disable 4G fallback" checkbox by the user 160 disables network fallback from Next Generation network 120 to 4G network 130 if the calling party is not "white listed." Selection of the "Enable 4G fallback" checkbox by the user 160 enables Next Generation network 120 to engage in network fallback to 4G network 130 subject to the selected user-configured criteria (described below) from section 510 and if the calling party is not "white listed."

User-configurable criteria selection section 510 lists multiple different network fallback criteria, each with an associated checkbox, that the user 160 may select to control the conditions under which call requests may be automatically rejected to prevent a possible fallback from, for example, 5G network service to 4G network service. The user-selected criteria from section 510 may subsequently be used to generate a set of call request rejection rules for this particular user 160's UE(s) 110.

Examples of multiple different network fallback criteria 525-1 through 525-5 are shown in section 510 of FIG. 5. Criteria 525-1 includes a checkbox, selection of which causes call requests that do not provide a calling party number to be rejected to avoid possible 4G fallback. Criteria 525-2 includes a checkbox, selection of which causes call requests from telephone numbers that are not in the user 160's address book or contacts list to be rejected to avoid possible 4G fallback. Criteria 525-3 includes a checkbox, selection of which causes a call request from a calling party number to be rejected to avoid possible 4G fallback if a previous call(s) from that number was less than a certain threshold (e.g., 3 seconds) in length. Criteria 525-4 includes a checkbox, selection of which causes call requests from any calling party telephone number not on the user 160's white list to be rejected to avoid possible 4G fallback. Criteria 525-5 includes a checkbox, selection of which causes call requests, which a spam filter scores at a level that indicates that the calls are likely spam, to be rejected to avoid possible 4G fallback. For example, a spam filter executed by a node in Next Generation network 120, 4G network 130, and/or IMS network 140 may generate a spam score for each call that predicts a likelihood that the call is spam, and if the spam score is higher than a threshold value, the call is automatically rejected to avoid possible 4G fallback.

A set of network fallback rules may subsequently be generated based on the criteria 525 selected by the user 160 for that user 160's UE(s) 110. For example, if the user 160 selects criteria 525-1, "reject SIP call requests that do not provide a calling party number," then a network fallback rule is generated such as the following: If the SIP call request does not include a calling party number, then reject the call request to avoid network fallback from 5G to 4G.

White list additions section 515 includes one or more fields that enables the user 160 to enter telephone numbers that are to be placed within a "white list" for that user 160. Placement of a telephone number in the user 160's white list indicates that the calls from that particular telephone number may be permitted to engage in network fallback and be redirected from the Next Generation network 120 to the 4G network 130.

The exemplary user interface 500 of FIG. 5A depicts examples of a number of user-configurable criteria 525-1 through 525-5 that may be selected by a user 160 of a UE 110. In other implementations, other criteria, in addition to, and/or instead of, those shown in FIG. 5A, may be presented in user interface 500 for selection by the user 160.

Figure 5B:
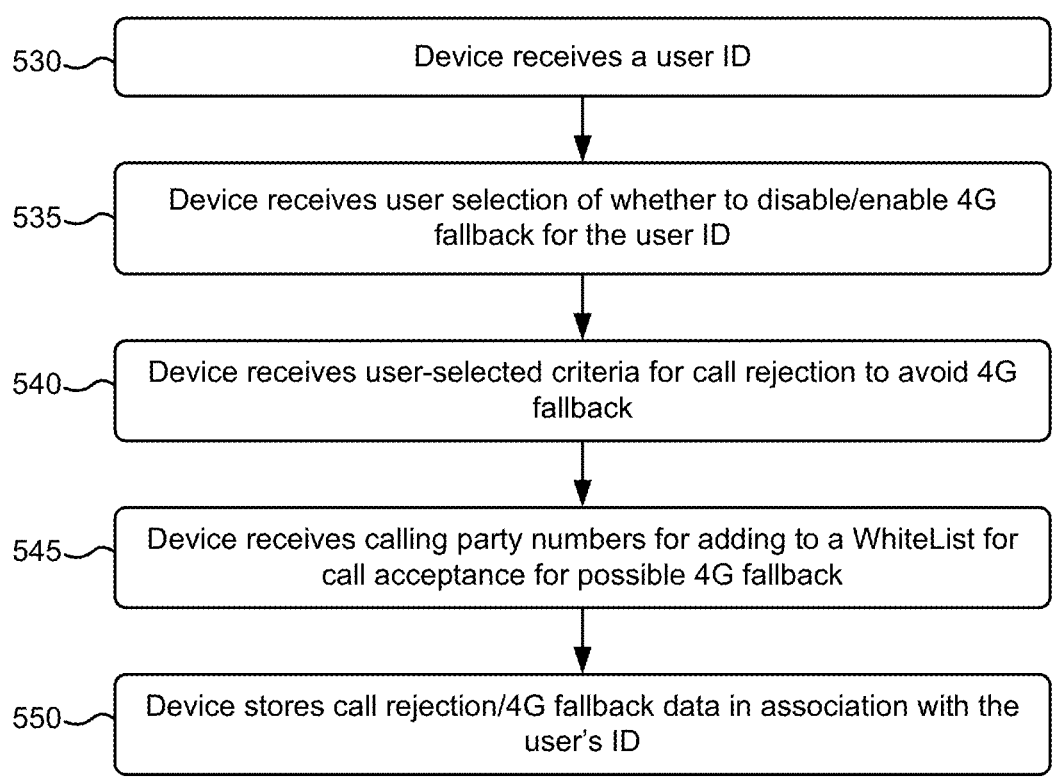
FIG. 5B is a flow diagram of an exemplary process for receiving user-selected parameters associated with determining whether network fallback should be permitted for a particular user.

FIG. 5B is a flow diagram of an exemplary process for receiving user-selected parameters associated with determining whether network fallback should be permitted for a particular user. The exemplary process of FIG. 5B may be implemented by a UE 110, and is described below with reference to the exemplary user interface 500 of FIG. 5A. The exemplary process of FIG. 5B may be repeated for each time a user at a UE 110 provides the user-selected parameters associated with network fallback.

The exemplary process may include device 110 receiving a user ID (block 530). UE 110 may, for example, receive a user entered user ID via user ID field 505 of user interface 500, as described above with respect to FIG. 5A.

Device 110 receives a user selection of whether to disable or enable 4G fallback for the user ID (block 535) and receives user-selected criteria for call rejection to avoid 4G fallback (block 540). UE 110 may, for example, receive a selection of the "disable 4G fallback" or "enable 4G fallback" checkboxes 520 of user interface 500, as described above with respect to FIG. 5A. UE 110 may additionally receive user-selected network fallback criteria 525-1 through 525-5 via section 510 of user interface 500, as described above with respect to FIG. 5A.

Device 110 receives calling party numbers for adding to a Whitelist for call acceptance for possible 4G fallback (block 545), and stores call rejection/4G fallback data in association with the user's ID (block 550). UE 110 may, for example, receive user entered calling party numbers in the "White List additions" section 515 of user interface 500, as described above with respect to FIG. 5A. The user of UE 110 may enter the telephone numbers of the parties from which the user wishes to avoid rejecting SIP call requests. UE 110 stores the user data received in blocks 530-545 in local memory at UE 110 and/or forwards the user data to an external device or database (e.g., to TAS 320 for storing).

Figure 6A:
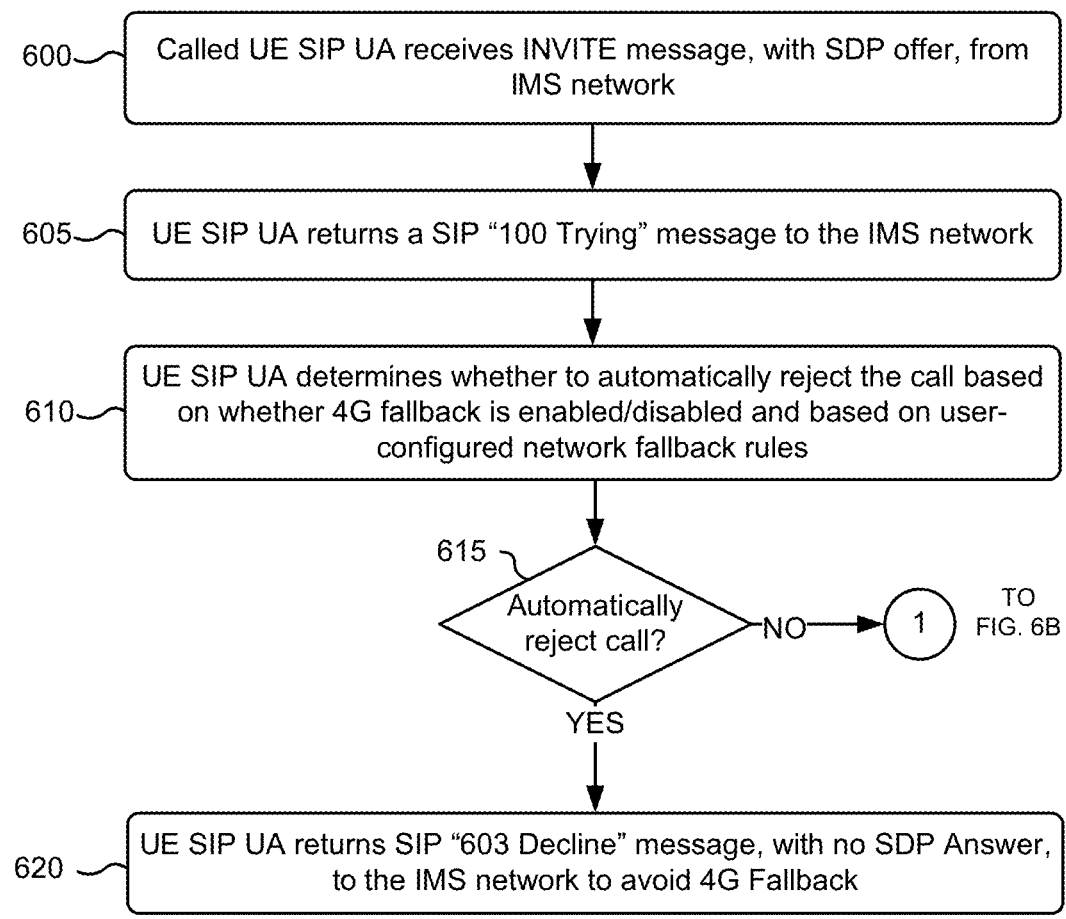
FIGS. 6A and 6B are flow diagrams of a first exemplary process for rejecting calls to avoid possible network fallback between a first wireless network and a second wireless network.
Figure 6B:
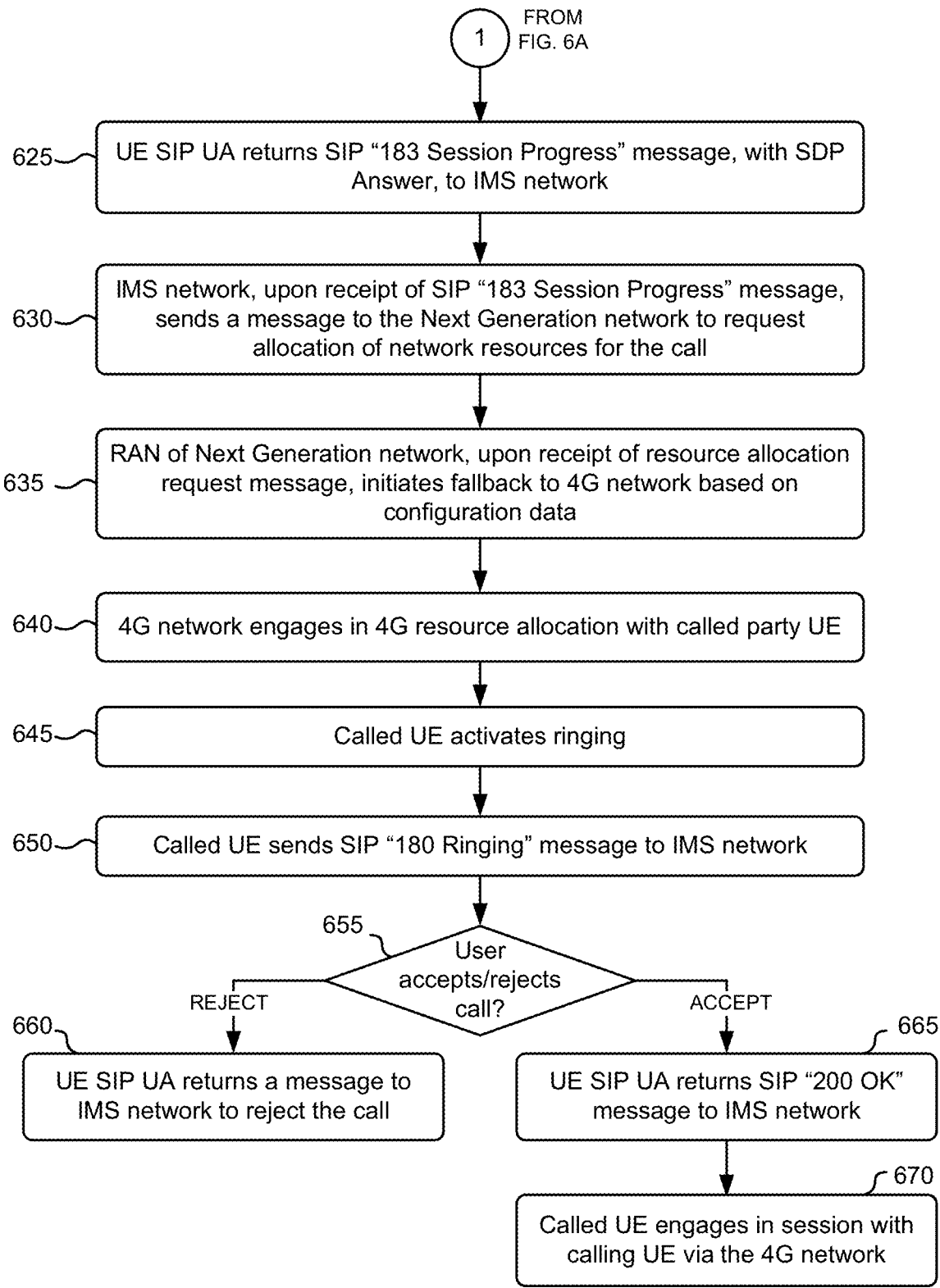

FIGS. 6A and 6B are flow diagrams of a first exemplary process for rejecting calls to avoid possible network fallback between a first wireless network and a second wireless network. The exemplary process of FIGS. 6A and 6B may be implemented by a SIP UA 150 at a called UE 110, and is described below with reference to the messaging/operations diagram of FIG. 7. The exemplary process of FIGS. 6A and 6B may be repeated for each call attempt received by a called UE 110-2 from a calling UE 110-1.

Figure 7:
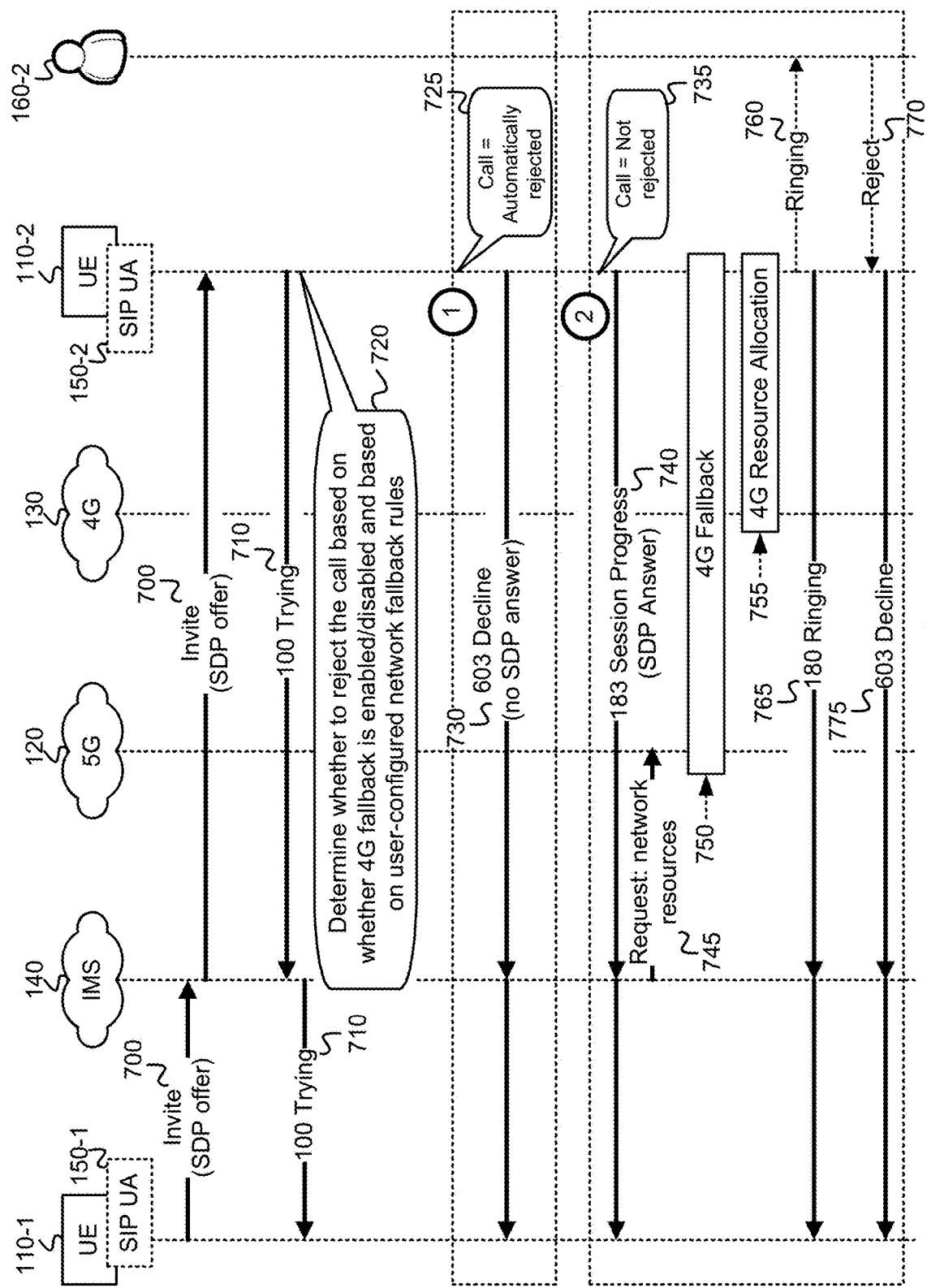
FIG. 7 depicts exemplary operations, messages, and data flows associated with the exemplary process of FIGS. 6A and 6B.

The exemplary process may include a called UE 110's SIP UA 150 receiving a SIP INVITE message, with a SDP offer, from IMS network 140 (block 600), and the called UE 110's SIP UA 150 returning a SIP "100 Trying" message to the IMS network 140 (block 605). The INVITE message invites the called party to a call session with the calling party. A SDP offer/answer process may be used by the calling UE 110-1 and the called UE 110-2 to reach agreement on a session description, such as, for example, which media streams are in the session, which codec to use for the session. The SDP offer indicates a desired session description, and a responsive SDP answer replies to the offer by indicating the desired session description from the called UE 110-2's viewpoint. The SDP offer/answer process can be used to create sessions or to modify an existing session. In SIP, the "100 Trying" message indicates that the call request has been received and is being processed. FIG. 7 illustrates UE 110-1 sending an INVITE message 700, that includes an SDP offer, to IMS network 140, IMS network 140 forwarding the INVITE message 700 to the called UE 110-2. FIG. 7 further shows the called UE 110-2, upon receipt of the INVITE message 700, returning a "100 Trying" message 710 to the IMS network 140, and the IMS network 140 forwarding the "100 Trying" message 710 to the calling UE 110-1.

The called UE 110's SIP UA 150 determines whether to automatically reject the call based on whether 4G fallback is enabled/disabled and based on user-configured network fallback rules (block 610). Network fallback rules may have been generated, as described above with reference to the exemplary user interface 500 of FIG. 5A, based on user 160 selection from multiple different network fallback criteria (e.g., 525-1 through 525-5 of FIG. 5A) and stored for future retrieval. The called UE 110-2's SIP UA 150 retrieves the network fallback rules previously generated for the called UE 110-2, or for the user 160-2's account, and applies the network fallback rules to the call attempt to determine whether to automatically reject the incoming call to avoid possible 4G fallback for the call. An exemplary implementation of the determination of whether to automatically reject an incoming call to avoid 4G fallback is described below with respect to the process of FIG. 6C. FIG. 7 depicts the SIP UA at UE 110-2 determining 720 whether to automatically reject the call based on whether 4G fallback is enabled/disabled and based on user-configured network fallback rules.

If it is determined that the call should be automatically ejected (YES—block 615), then the called UE 110's SIP UA 150 returns a SIP "603 Decline" message, with no SDP Answer, to IMS network 140 to avoid 4G fallback (block 620). The SIP "603 Decline" message indicates that the called party does not wish to participate in the call. FIG. 7 depicts a first circumstance (identified with a "1" within a circle) where xUA 150-2 at UE 110-2 determines that the call should be automatically rejected 725, and returns a SIP "603 Decline" message 730 to IMS network 140 which, in turn, forwards the message 730 to the calling UE 110-1.

If it is determined that the call should not be automatically rejected (NO—block 615), then the called UE 110's SIP UA 150 returns a SIP "183 Session Progress" message, with a SDP Answer, to IMS network 140 (block 625) and IMS network 140, upon receipt of the "183 Session Progress" message, sends a message to the Next Generation network 120 to request allocation of network resources for the call (block 630). The SIP "183 Session Progress" message is a provisional message sent responsively when a call is in the process of being established. The SDP answer included with the "183 Session Progress" message indicates the called UE 110-2's desired session description. FIG. 7 depicts a second circumstance (identified with a "2" within a circle) where SIP UA 150-2 at UE 110-2 determines that the incoming call is not to be rejected 735 and returns a SIP "183 Session Progress" message 740 to IMS network 140 that includes the SDP Answer. IMS network 140, in turn, forwards the SIP "183 Session Progress" message 740 to the calling UE 110-1. FIG. 7 further shows IMS network 140, upon receipt of the SIP "183 Session Progress" message 740, sending a request 745 to 5G network 120 to request the allocation of network resources for the call.

The RAN 215 of Next Generation network 120, upon receipt of the resource allocation request from the IMS network 140, initiates fallback to 4G network 130 based on configuration data (block 635), and 4G network 130 then engages in 4G resource allocation with the called party UE 110 (block 640). The fallback from Next Generation network 120 to 4G network 130 involves existing techniques for redirecting network service involving the called UE 110-2 from the Next Generation network 120 to the 4G network 130. FIG. 7 shows the 5G network 120, 4G network 130, and called UE 110-2 engaging in a 4G fallback process 750, and 4G network 130 engaging in a 4G resource allocation process 755 with the called UE 110-2.

The called UE 110 activates ringing (block 645) and sends a SIP "180 ringing" message to IMS network 140 (block 650). Once the 4G fallback process of block 635 and the 4G resource allocation process 755 of block 640 are completed, called UE 110-2 activates ringing to alert the user 160-2 of the incoming call and also notifies the IMS network 140 of the ringing attempt for user 160-2 to answer the call at UE 110-2. FIG. 7 depicts UE 110-2 activating ringing 760 to alert user 160-2 to the incoming call.

The called UE 110's SIP UA 150 determines if the user 160 accepts or rejects the call (block 655). The user 160 may elect to accept to reject the incoming call by, for example, use of the user interface of the called UE 110. For example, the user 160 may touch, or drag, an "answer call" button or slider on a touch screen user interface of the called UE 110. If the user 160 rejects the call (REJECT—block 655), then the called UE 110's SIP UA 150 returns a message to IMS network 140 to reject the call (block 660). The message may include, for example, a "603 Decline" message or a "607 unwanted" message. FIG. 7 depicts an example of user 160-2 electing to reject 770 the incoming call (e.g., select "do not answer" or "reject call" on a user interface of UE 110-2), and SIP UA 150-2 of UE 110-2 sending a SIP "603 Decline" message 775 in response to the user 160-2's rejection of the incoming call. If the user 160 accepts the call (ACCEPT—block 655), then the called UE 110's SIP UA 150 returns a SP "200 OK" message to IMS network 140 (block 665). The called UE 110-2 subsequently engages in a session with the calling UE 110-1 via the 4G network 130 (block 670).

Figure 6C:
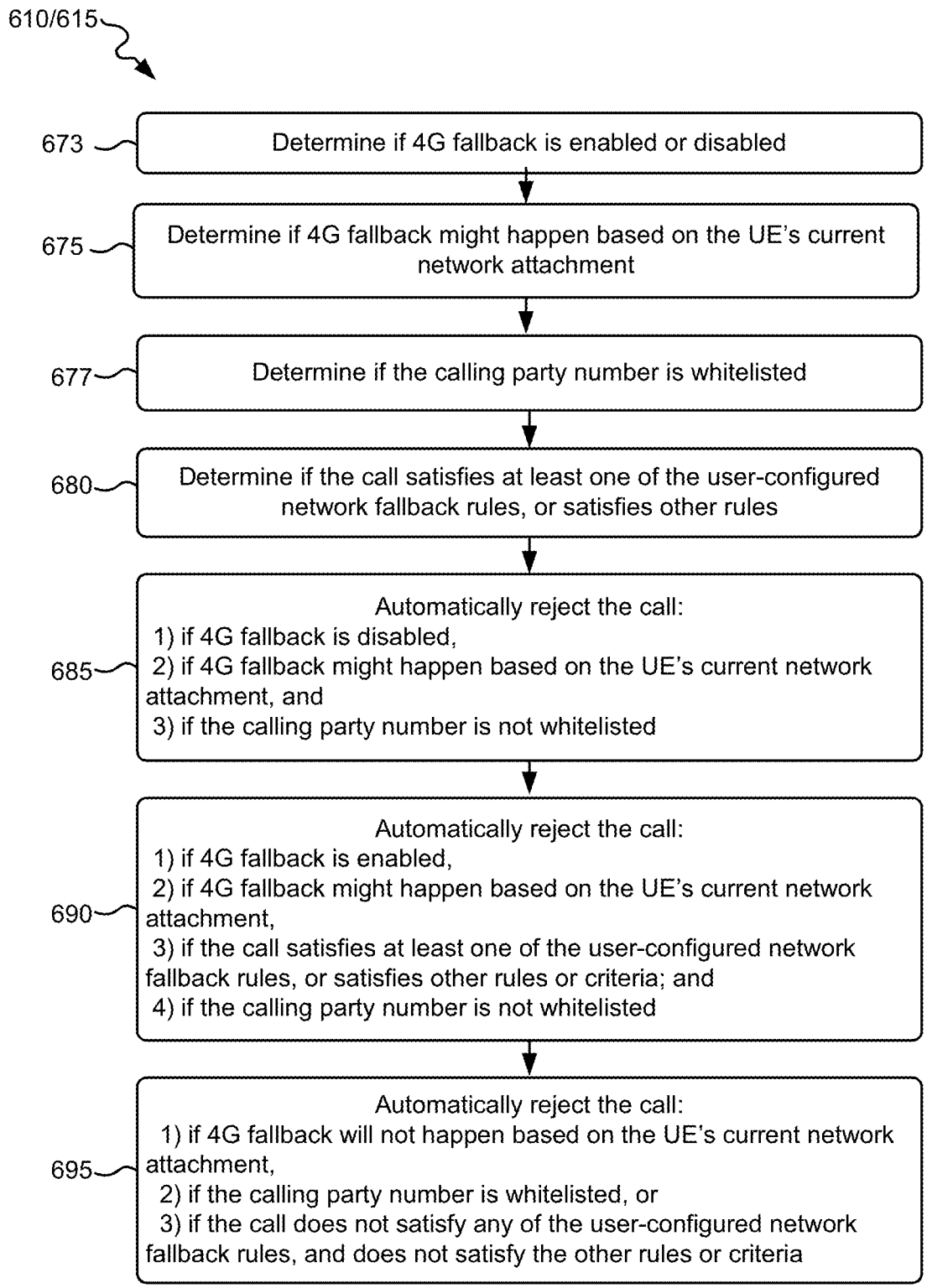
FIG. 6C is a flow diagram of an exemplary process for determining whether to automatically reject an incoming call to avoid network fallback.

FIG. 6C is a flow diagram of an exemplary process for determining whether to automatically reject an incoming call to avoid network fallback. The exemplary process of FIG. 6C describes details of one exemplary implementation of blocks 610 and 615 of the process of FIGS. 6A and 6B, or one exemplary implementation of blocks 810 and 815 of the process of FIGS. 8A-8C. The exemplary process of FIG. 6C may be implemented by a SIP UA 150 at a called UE 110, and may be repeated upon each occurrence of blocks 610 and 615 of FIG. 6A described above. Alternatively, the exemplary process may be implemented by a TAS 320 and may be repeated upon each occurrence of blocks 810 and 815 of FIG. 8A described below.

The exemplary process includes the called UE 110 or TAS 320 determining if 4G fallback is enabled or disabled (block 673). The UE 110 or TAS 320 may retrieve the user-selected 4G fallback enable/disable data from the call rejection/4G fallback data stored in block 550. The user of UE 110 may have previously selected, via user interface 500, one of the 4G fallback disable or enable checkboxes 520.

The called UE 110 or TAS 320 determines if 4G fallback might happen based on the UE's current network attachment (block 675). 4G fallback might happen: 1) if UE 110 is attached to Next Generation network 120, 2) the UE 110's IMS registration is via RAN 215 of Next Generation network 120, and 3) the UE 110 receives and accepts a voice call. 4G fallback will not happen: 1) if the UE 110 is attached to 4G network 130 and 2) UE 110 receives and accepts a voice call. 4G fallback will also not happen: 1) if the UE 110 is attached to Next Generation network 120, 2) the UE 110's IMS registration is via a Wireless Local Area Network (WLAN) (e.g., a WiFi network), and 3) the UE 110 receives and accepts a voice call.

The called UE 110 or TAS 320 determines if the calling party number is whitelisted (block 677). The UE 110 or TAS 320 may retrieve whitelisted calling party numbers from the call rejection/4G fallback data stored in block 550. The user of UE 110 may have previously entered calling party numbers in the White List additions section 515 of user interface 500.

The called UE 110 or TAS 320 determines if the call satisfies at least one of the user-configured network fallback rules, or satisfies other rules (block 680). The UE 110 or TAS 320 may compare the call with network fallback rules previously generated based on the user-configured 4G fallback criteria entered by the user in section 510 of user interface 500. For example, if the call does not provide a calling party number, then the call may be determined to satisfy a rule generated based on the user selecting the "Block SIP call requests that do not provide a calling party number" checkbox 525-1 of section 510 of user interface 500.

The called UE 110 or TAS 320 automatically rejects the call (block 685): 1) if 4G fallback is disabled, as determined in block 673; 2) if 4G fallback might happen based on the UE 110's current network attachment, as determined in block 675; and 3) if the calling party number is not whitelisted, as determined in block 677.

The called UE 110 or TAS 320 automatically rejects the call (block 690): 1) if 4G fallback is enabled, as determined in block 673; 2) if 4G fallback might happen based on the UE's current network attachment, as determined in block 675; 3) if the call satisfies at least one of the user-configured network fallback rules, or satisfies other network fallback rules, as determined in block 680, and 4) if the calling party number is not whitelisted, as determined in block 677.

The called UE 110 or TAS 320 does not automatically reject the call (block 695): 1) if 4G fallback will not happen based on the UE's current network attachment, as determined in block 675; 2) if the calling party number is whitelisted, as determined in block 677; and 3) if the call does not satisfy at least one of the user-configured network fallback rules, and does not satisfy other network fallback rules, as determined in block 680.

Figure 8A:
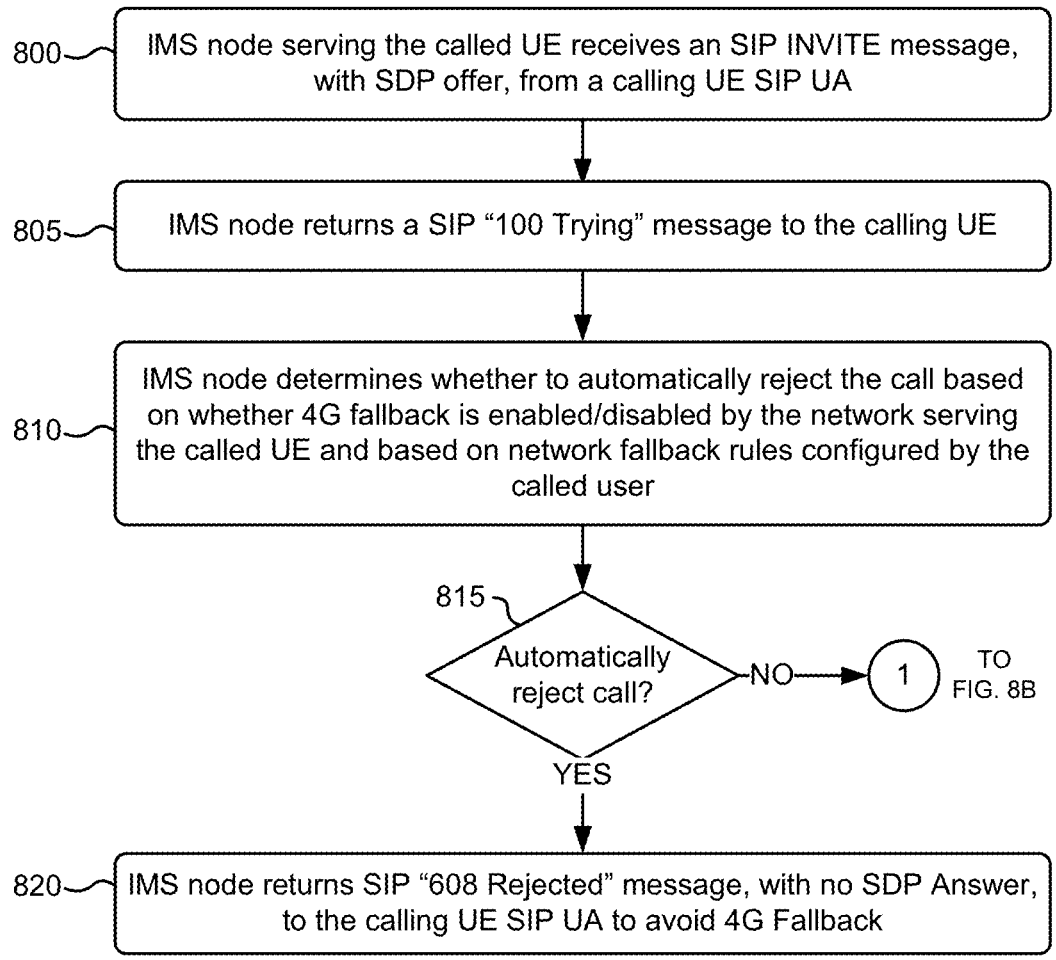
FIGS. 8A-8C are flow diagrams of a second exemplary process for rejecting calls to avoid possible network fallback between a first wireless network and a second wireless network.
Figure 8B:
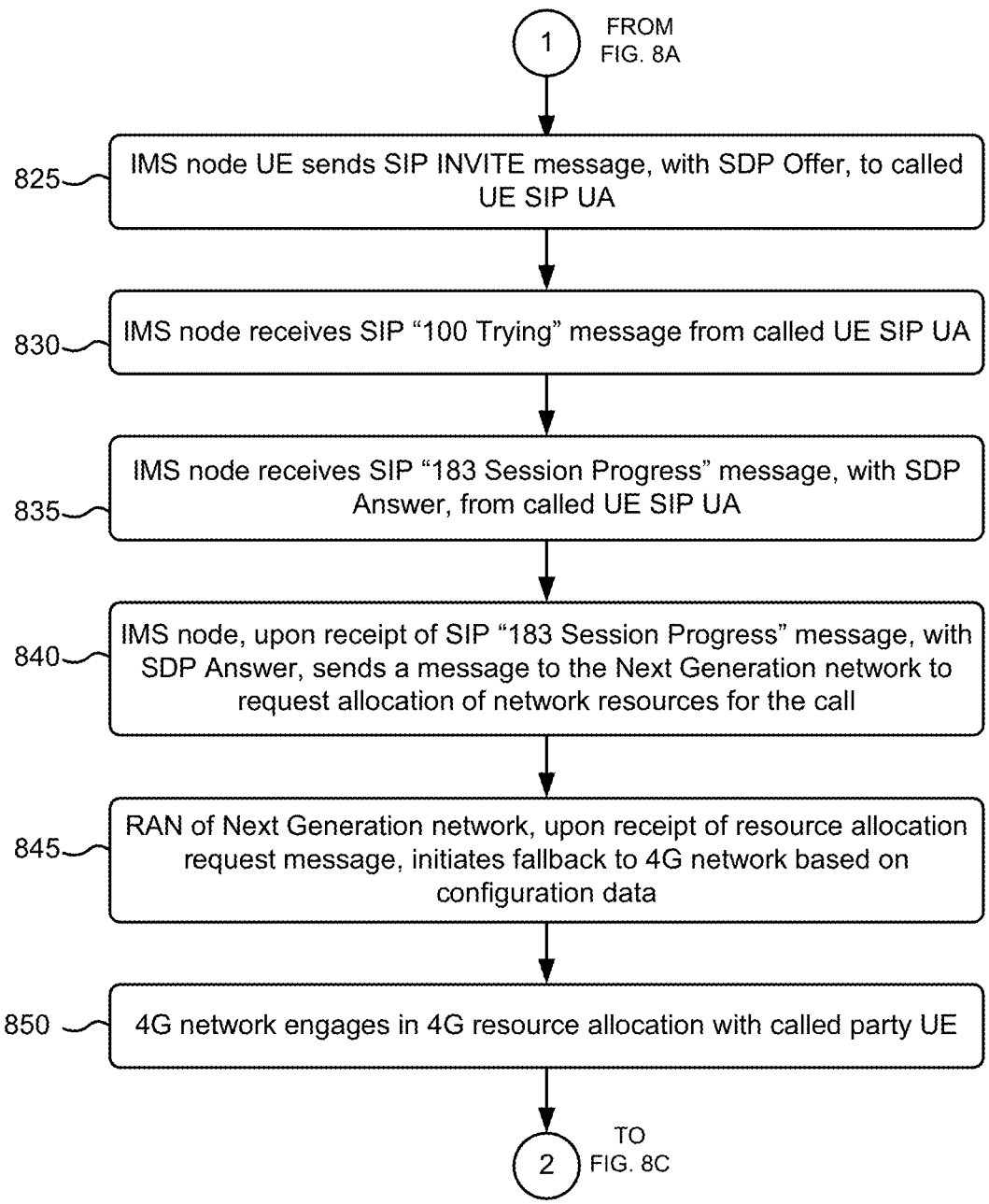
Figure 8C:
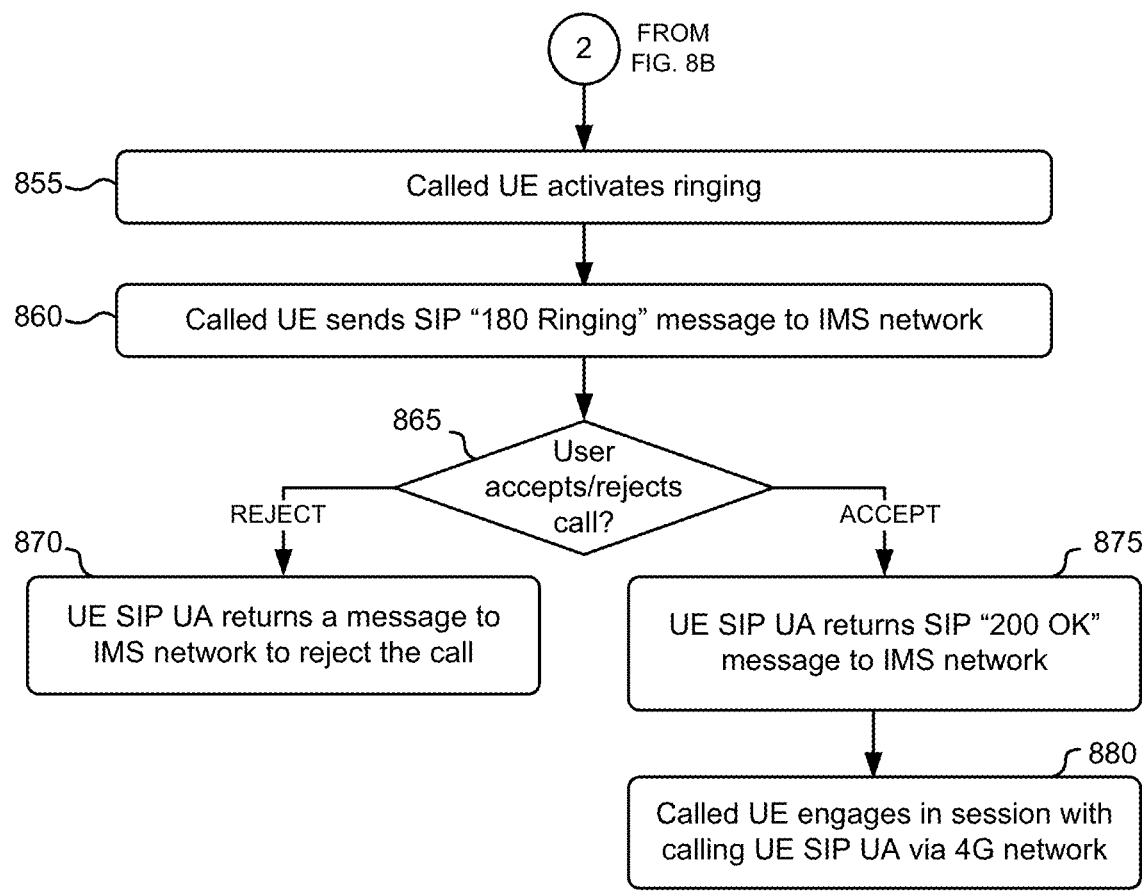

FIGS. 8A and 8B are flow diagrams of an exemplary process for a second exemplary process for rejecting calls to avoid possible network fallback between a first wireless network and a second wireless network. The exemplary process of FIGS. 8A and 8B may be implemented by an "IMS node" within IMS network 140, and is described below with reference to the messaging/operations diagram of FIG. 9. In one implementation, the "IMS node" referred to in the blocks of the process of FIGS. 8A and 8B may be a TAS 320 that serves the called UE 110. In other implementations, the "IMS node" referred to may be another node in IMS network 140 such as, for example, a CSCF 310. The exemplary process of FIGS. 8A and 8B may be repeated for each call attempt received by the "IMS node" (e.g., TAS 320 or other node in IMS network 140), from a calling UE 110-1, for establishing a call with a called UE 110-2.

Figure 9:
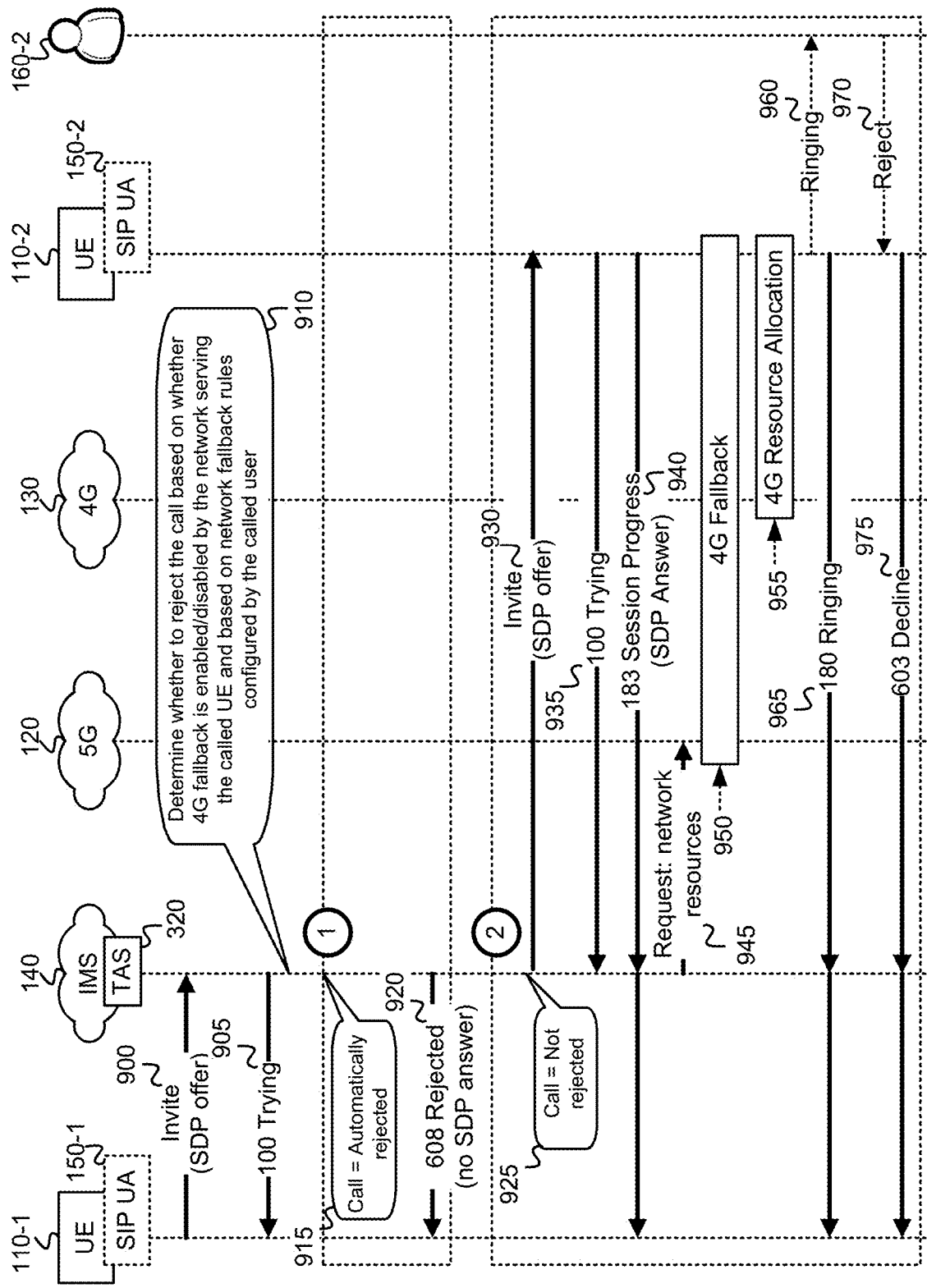
FIG. 9 depicts exemplary operations, messages, and data flows associated with the exemplary process of FIGS. 8A-8C.

The exemplary process may include the IMS node serving the called UE 110 receiving a SIP INVITE message, with SDP offer, from a calling UE 110's SIP UA 150 (block 800) and the IMS node returning a SIP "100 Trying" message to the calling UE 110 (block 805). The INVITE message invites the called party (e.g., UE 110-2) to a call session with the calling party (e.g., UE 110-1). The "100 Trying" message indicates that the call request has been received by IMS network 140 and is being handled. FIG. 9 illustrates UE 110-1 sending an INVITE message 900, that includes an SDP offer, to TAS 320 of IMS network 140, and TAS 320 returning a "100 Trying" message 905 to the calling UE 110-1.

The called UE 110's SIP UA 150 determines whether to automatically reject the call based on whether 4G fallback is enabled/disabled by the network serving the called UE and based on network fallback rules configured by the called user (block 810). Network fallback rules may have been generated, as described above with reference to the exemplary user interface 500 of FIG. 5, based on the called user 160's selection from multiple different network fallback criteria (e.g., 525-1 through 525-5 of FIG. 5) and stored for future retrieval. The TAS 320 serving the called UE 110-2 retrieves the network fallback rules previously generated for the called UE 110-2 (e.g., by the user 160-2), or generated for the user 160-2's account, and applies the network fallback rules to the call attempt to determine whether to automatically reject the call to avoid possible 4G fallback for the call. An exemplary implementation of the determination of whether to automatically reject an incoming call to avoid 4G fallback has been described above with respect to the process of FIG. 6C. FIG. 9 depicts TAS 320 of IMS network 140, that serves the called UE 110-2, determining 910 whether to reject the call based on whether 4G fallback is enabled/disabled by the network serving the called UE 110-2 and based on network fallback rules configured by the called user 160-2.

If it is determined that the call should be automatically rejected (YES—block 815), then the IMS node that serves the called UE 110 in IMS network 140 returns a SIP "608 Rejected" message, with no SDP Answer, to the calling UE 110's SIP UA 150 to avoid 4G fallback (block 820). The SIP "608 Rejected" message indicates that an intermediary network node (e.g., the node in IMS network 140) has rejected the call. FIG. 9 depicts a first circumstance (identified with a "1" within a circle) where TAS 320, that serves the called UE 110-2, in IMS network 140 determines that the call should be rejected 915 and returns a SIP "608 Rejected" message 920 to calling UE 110-1.

If it is determined that the call should not be automatically rejected (NO—block 815), then the IMS node that serves the called UE 110 sends a SIP INVITE message, with SDP offer, to the called UE 110's SIP UA 150 (block 825)(FIG. 8B), and the IMS node receives, responsive to the INVITE message, a SIP "100 Trying" message from the called UE 110's SIP UA 150. The "100 Trying" message indicates that the call request has been received by called UE 110-2 and is being processed. FIG. 9 depicts a second circumstance (identified with a "2" within a circle) where TAS 320, that serves the called UE 110-2, in IMS network 140 determines that the call should not be rejected 925, and then sends a SIP INVITE message 930, with SDP offer, to the called UE 110-2, and the called UE 110-2 responds to the SIP INVITE message 930 by returning a SIP "100 Trying" message 935 to TAS 320.

The IMS node that serves the called UE 110 receives a SIP "183 Session Progress" message, with a SDP Answer, from the called UE 110's SIP UA 150 (block 835), and the IMS node, upon receipt of the "183 Session Progress" message, sends a message to the Next Generation network 120 to request allocation of network resources for the call (block 840). The SIP "183 Session Progress" message is a provisional message sent responsively by the called UE 110. The SDP answer included with the "183 Session Progress" message indicates the called UE 110-2's desired session description. FIG. 9 shows SIP UA 150-2 at UE 110-2 returning a SIP "183 Session Progress" message 940 to IMS network 140 that includes the SDP Answer, and IMS network 140, in turn, forwarding the SIP "183 Session Progress" message 940 to the calling UE 110-1. FIG. 9 further shows IMS network 140, upon receipt of the SIP "183 Session Progress" message 940, sending a request 945 to 5G network 120 to request the allocation of network resources for the call.

The RAN 215 of Next Generation network 120, upon receipt of the resource allocation request from the IMS network 140, initiates fallback to 4G network 130 based on configuration data (block 845), and 4G network 130 then engages in 4G resource allocation with the called party UE 110 (block 850). The fallback from Next Generation network 120 to 4G network 130 involves existing techniques for redirecting network service involving the called UE 110-2 from the Next Generation network 120 to the 4G network 130. FIG. 9 shows the 5G network 120, 4G network 130, and called UE 110-2 engaging in a 4G fallback process 950, and 4G network 130 engaging in a 4G resource allocation process 955 with the called UE 110-2.

The called UE 110 activates ringing (block 855) and sends a SIP "180 ringing" message to IMS network 140 (block 860). Once the 4G fallback process of block 845 and the 4G resource allocation process of block 850 are completed, called UE 110-2 activates ringing to alert the user 160-2 of the incoming call and also notifies the IMS network 140 of the ringing attempt for user 160-2 to answer the call at UE 110-2. FIG. 9 depicts UE 110-2 activating ringing 960 to alert user 160-2 to the incoming call.

The called UE 110's SIP UA 150 determines if the user 160 accepts or rejects the call (block 865). The user 160 may elect to accept to reject the incoming call by, for example, use of the user interface of the called UE 110. For example, the user 160 may touch, or drag, an "answer call" button or slider on a touch screen user interface of the called UE 110. If the user 160 rejects the call (REJECT—block 865), then the called UE 110's SIP UA 150 returns a SIP message to IMS network 140 to reject the call (block 870). The message may include, for example, a "603 Decline" message or a "607 unwanted" message. FIG. 9 depicts an example of user 160-2 electing to reject 970 the incoming call (e.g., select "do not answer" or "reject call" on a user interface of UE 110-2), and SIP UA 150-2 of UE 110-2 sending a SIP "603 Decline" message 975 in response to the user 160-2's rejection of the incoming call. If the user 160 accepts the call (ACCEPT—block 865), then the called UE 110's SIP UA 150 returns a SP "200 OK" message to IMS network 140 (block 875), and the called UE 110-2 subsequently engages in a session with the calling UE 110-1 via the 4G network 130 (block 880).

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5B, 6A, 6B, 6C, 8A, 8B, and 8C, and sequences of operations, messages, and data flows with respect to FIGS. 7 and 9, the order of the blocks and/or the operations, messages, and data flows may be varied in other implementations. Moreover, non-dependent blocks may be performed in parallel. Exemplary embodiments herein have been described as using SIP messages (e.g., SIP INVITE, SIP 100 Trying, SIP 603 Decline, SIP 183 Session Progress, etc.). However, protocols other than SIP may be used in the techniques described herein. Such protocols may employ messaging that is different than the SIP messages described herein.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 415) of a device. A non-transitory storage medium includes one or more of the storage mediums described in relation to memory/storage 420/440. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
receiving, at a device, a call invitation message for establishing a call between a calling party and a called party;
obtaining a set of network fallback rules associated with the called party, wherein the set of network fallback rules are based on called party-selected network fallback criteria selected and customized by the called party for receiving calls and wherein the set of network fallback rules comprises:
a) rejecting call requests from a calling party number if a previous call from that number was less than a certain threshold in length;
b) rejecting call requests from any calling party number not on the called party's white list; and
c) rejecting call requests based on a spam filter score generated by a spam scoring process;
determining, based on the set of network fallback rules, whether to reject the call and avoid a network fallback from a first wireless network to a second wireless network; and
sending, by the device based on the determination, a call denial message to reject the call and avoid the network fallback.

2. The method of claim 1, wherein the first wireless network comprises a Next Generation network, wherein the second wireless network comprises a Fourth Generation (4G) network, and wherein the network fallback comprises redirecting and establishing the call via the 4G network instead of the Next Generation network.

3. The method of claim 1, wherein the device comprises a user equipment device (UE).

4. The method of claim 1, wherein the device comprises a telephony application server (TAS) in an Internet Protocol Multimedia Subsystem (IMS) network.

5. The method of claim 1, wherein the call denial message comprises one of:
a) a Session Initiation Protocol (SIP) 603 Decline message without an SDP answer; or
b) a SIP 608 Rejected message without the SDP answer.

6. The method of claim 1, wherein the call invitation message includes a Session Description Protocol (SDP) offer and wherein the call denial message omits an SDP answer.

7. The method of claim 1, wherein the set of network fallback rules comprises:
a) rejecting call requests that do not provide a calling party number; and
b) rejecting call requests from numbers not in the called party's address book.

8. A device, comprising:
a communication interface configured to receive a call invitation message for establishing a call between a calling party and a called party; and
a processing unit configured to:
obtain a set of network fallback rules associated with the called party, wherein the set of network fallback rules are based on called party-selected network fallback criteria selected and customized by the called party for receiving calls and wherein the set of network fallback rules comprises:
a) rejecting call requests from a calling party number if a previous call from that number was less than a certain threshold in length;
b) rejecting call requests from any calling party number not on the called party's white list; and
c) rejecting call requests based on a spam filter score generated by a spam scoring process;
determine, based on the set of network fallback rules, whether to reject the call and avoid network fallback from a first wireless network to a second wireless network; and
send, via the communication interface based on the determination, a call denial message, to reject the call and avoid the network fallback.

9. The device of claim 8, wherein the first wireless network comprises a Next Generation network, wherein the second wireless network comprises a Fourth Generation (4G) network, and wherein the network fallback comprises redirecting and establishing the call via the 4G network instead of the Next Generation network.

10. The device of claim 8, wherein the device comprises a user equipment device (UE).

11. The device of claim 8, wherein the device comprises a telephony application server (TAS) in an Internet Protocol Multimedia Subsystem (IMS) network.

12. The device of claim 8, wherein the call denial message comprises one of:
a) a Session Initiation Protocol (SIP) 603 Decline message without an SDP answer; or
b) a SIP 608 Rejected message without the SDP answer.

13. The device of claim 8, wherein the call invitation message includes a Session Description Protocol (SDP) offer and wherein the call denial message omits an SDP answer.

14. A non-transitory storage medium storing instructions executable by a device with one or more processors, wherein execution of the instructions cause the device to:
receive a call invitation message for establishing a call between a calling party and a called party;
obtain a set of network fallback rules associated with the called party, wherein the set of network fallback rules are based on called party-selected network fallback criteria selected and customized by the called party for receiving calls and wherein the set of network fallback rules comprises:
a) rejecting call requests from a calling party number if a previous call from that number was less than a certain threshold in length;
b) rejecting call requests from any calling party number not on the called party's white list; and
c) rejecting call requests based on a spam filter score generated by a spam scoring process;
determine, based on the set of network fallback rules, whether to reject the call and avoid network fallback from a first wireless network to a second wireless network; and
send, based on the determination, a call denial message, to reject the call and avoid the network fallback.

15. The non-transitory storage medium of claim 14, wherein the first wireless network comprises a Next Generation network, wherein the second wireless network comprises a Fourth Generation (4G) network, and wherein the network fallback comprises redirecting and establishing the call via the 4G network instead of the Next Generation network.

16. The non-transitory storage medium of claim 14, wherein the device comprises one of a user equipment device (UE), or a telephony application server (TAS) in an Internet Protocol Multimedia Subsystem (IMS) network.

17. The non-transitory storage medium of claim 14, wherein the call denial message comprises one of:
a) a Session Initiation Protocol (SIP) 603 Decline message without an SDP answer; or
b) a SIP 608 Rejected message without the SDP answer.

18. The non-transitory storage medium of claim 14, wherein the call invitation message includes a Session Description Protocol (SDP) offer and wherein the call denial message omits an SDP answer.

* * * * *